(12) United States Patent
Sarrafzadeh et al.

(10) Patent No.: US 9,659,044 B2
(45) Date of Patent: May 23, 2017

(54) EFFICIENT SEARCHING OF STATIONARY DATASETS

(75) Inventors: Majid Sarrafzadeh, Anaheim Hills, CA (US); Jonathan S. Woodbridge, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 357 days.

(21) Appl. No.: 14/233,091

(22) PCT Filed: Jul. 19, 2012

(86) PCT No.: PCT/US2012/047471
§ 371 (c)(1),
(2), (4) Date: Jan. 15, 2014

(87) PCT Pub. No.: WO2013/013087
PCT Pub. Date: Jan. 24, 2013

(65) Prior Publication Data
US 2014/0180998 A1    Jun. 26, 2014

Related U.S. Application Data

(60) Provisional application No. 61/509,991, filed on Jul. 20, 2011.

(51) Int. Cl.
*G06F 9/44*      (2006.01)
*G06N 7/02*     (2006.01)
*G06N 7/06*     (2006.01)
*G06F 17/30*    (2006.01)
*G06N 5/04*     (2006.01)

(52) U.S. Cl.
CPC .. *G06F 17/30321* (2013.01); *G06F 17/30244* (2013.01); *G06F 17/30477* (2013.01); *G06N 5/048* (2013.01)

(58) Field of Classification Search
CPC ......... G06F 17/30244; G06F 17/30321; G06F 17/30477; G06N 5/048; G06N 7/02; G06N 7/06; G06K 2209/051; G06K 9/3216; G06T 3/0075
See application file for complete search history.

(56) References Cited

U.S. PATENT DOCUMENTS

| | | | |
|---|---|---|---|
| 2003/0225761 A1* | 12/2003 | Wagener | G06F 17/30477 |
| 2007/0047840 A1* | 3/2007 | Xu | G06K 9/3216 |
| | | | 382/294 |
| 2008/0037877 A1 | 2/2008 | Jia et al. | |
| 2008/0085032 A1 | 4/2008 | Cerosaletti et al. | |

(Continued)

OTHER PUBLICATIONS

International Search Report for International Application No. PCT/US2012/047471 dated Dec. 26, 2012.

(Continued)

*Primary Examiner* — Stanley K Hill
*Assistant Examiner* — Peter Coughlan
(74) *Attorney, Agent, or Firm* — Foley & Lardner LLP; Cliff Z. Liu (57) ABSTRACT

A saliency function is computed to indicate the saliency of each of a plurality of data points in a dataset. For each local maximum in the saliency function, a segment of the dataset is inserted into an index.

22 Claims, 5 Drawing Sheets

(56) References Cited

U.S. PATENT DOCUMENTS

| | | | |
|---|---|---|---|
| 2009/0192395 A1* | 7/2009 | Sweeney | G06F 19/321 600/509 |
| 2009/0285492 A1* | 11/2009 | Ramanujapuram | G06F 17/30244 382/209 |
| 2010/0257152 A1 | 10/2010 | Hrle et al. | |
| 2010/0322474 A1 | 12/2010 | Cheriyadat et al. | |
| 2011/0134245 A1* | 6/2011 | Khizhnichenko | G06K 9/00771 348/148 |

OTHER PUBLICATIONS

Faloutsos, et al., "Fast Subsequence Matching in Time-Series Databases," ACM SIGMOD Record, 23(2), (1994), pp. 419-429.

Guttman, A., R-Trees: A Dynamic Index Structure for Spatial Searching, Proceedings of Annual Meeting of ACM Sigmod, vol. 14, No. 2, Boston, Massachusetts, Jun. 18-21, 1984, 13 pages.

Hershberger, et al., "An O (n log n) Implementation of the Douglas-Peucker Algorithm for Line Simplification," Proceedings of the Tenth Annual Symposium on Computational Geometry, ACM, (1994), pp. 383-384.

Keogh et al., "Clustering of Time-Series Subsequences is Meaningless: Implications for Previous and Future Research," Knowledge and Information Systems, 8(2), (2005), pp. 154-177.

Keogh, et al., "Dimensionality Reduction for Fast Similarity Search in Large Time Series Databases," Knowledge and Information Systems, 3(3), (2001), pp. 263-286.

Lin et al., "Finding Motifs in Time Series," Proc. of 2nd Workshop on Temporal Data Mining (KDD'2), (2002), 11 pages.

Lowe, D.G., "Distinctive Image Features from Scale—Invariant Keypoints", International Journal of Computer Vision 60(2), (2004), pp. 91-110.

Mueen et al., "Exact Discovery of Time Series Motifs," In Proceedings of the SIAM International Conference on Data Mining (SDM 2009), Citeseer, pp. 473-484.

Mueen et al., "Finding Time Series Motifs in Disk-Resident Data", In 2009 Ninth IEEE International Conference on Data Mining, IEEE, (2009), pp. 367-376.

Perng, et al., "Landmarks: A New Model for Similarity-Based Pattern Querying in Time Series Databases," in icde, (2000), p. 33.

Shieh et al., "iSAX: Disk-Aware Mining and Indexing of Massive Time Series Datasets," Data Mining and Knowledge Discovery, 19(1), (2009), pp. 24-57.

Shieh et al., "iSAX: Indexing and Mining Terabyte Sized Time Series," In Proceeding of the 14th ACM SIGKDD International Conference on Knowledge Discovery and Data Mining, ACM, (2008), pp. 623-631.

* cited by examiner

EFFICIENT SEARCHING OF STATIONARY DATASETS

CROSS-REFERENCE TO RELATED APPLICATION

This application is a National Stage Entry of PCT/US2012/047471 filed on Jul. 19, 2012, which claims the benefit of U.S. Provisional Application Ser. No. 61/509,991 filed on Jul. 20, 2011, titled "Efficient Medical Signal Searching," the disclosure of which is incorporated herein by reference in its entirety.

STATEMENT REGARDING FEDERALLY SPONSORED RESEARCH OR DEVELOPMENT

This invention was made with Government support under Grant Number LM007356, awarded by the National Institutes of Health. The Government has certain rights in the invention.

BACKGROUND

A dataset is often quite large, requiring substantial digital storage capability. Further, it is challenging to search and analyze large quantities of data. Thus, it is desirable to identify and index salient features of a dataset, thereby reducing the quantity of data necessary to adequately represent the dataset, as well as facilitating quicker analysis.

SUMMARY

In a first embodiment, a non-transitory computer-readable storage medium includes executable instructions to receive digital data related to a stationary dataset, compute a saliency function indicating the saliency of each of a plurality of data points in the digital data, determine a set of at least one local maxima in the saliency function, and for each maximum in the set of at least one local maxima, insert a segment of the digital data into an index, the segment corresponding to a portion of the digital data including the data point associated with the local maximum.

In one implementation, the executable instructions to compute the saliency function of the plurality of points may include executable instructions to calculate a state probability distribution of the stationary dataset and based on the state probability distribution, group the digital data such that each data group has an equal probability of occurrence in the stationary dataset; and for each data group, calculate a transition distribution indicating the probability of a transition from the data group to other states. In another implementation, the executable instructions to compute the saliency function of the plurality of data points may include executable instructions to calculate a state probability distribution of the stationary dataset; and based on the state probability distribution, calculate a transition distribution indicating the probability of transitions between states.

In some implementations, the plurality of data points are associated with points in time in a stationary time series signal dataset. In other implementations, the plurality of data points are pixels in a stationary image dataset In some implementations, metadata may be included in the index, where the metadata is related to, for example, a local maximum, a data point associated with the local maximum, and the segment.

In a second embodiment, a system includes an input configured to receive time series signals, a conversion unit configured to convert a time series signal received at the input into a dataset of digital values; and a processing unit. The processing unit may be configured to determine a saliency function for the dataset indicating the saliency of a plurality of data points in the dataset; identify local maxima in the saliency function; and create an index of portions of the dataset, wherein each portion of the dataset includes a data point associated with a local maximum of the saliency function.

In some implementations, the processing unit is configured to create the index in near real time.

In a third embodiment, a saliency function is calculated for a plurality of data points in a stationary dataset, the saliency function indicating for each of the plurality of data points the probability that the data point would be in its current state given the states of neighbor data points. The saliency function is determined from a set of low-probability data points each of which has a low probability of occurrence. For each data point in the set of low-probability data points, a portion of the stationary dataset including that data point is inserted into the index.

In some implementations, the stationary dataset represents a stationary time series signal, the plurality of data points being associated with a plurality of points in time, respectively.

In some implementations, the stationary dataset represents a stationary image, the plurality of data points being associated with a plurality of pixels, respectively.

In some implementations, metadata is added to the index.

In some implementations, the dataset includes time series data relating to an electronic health signal. Such data may include one or more of: electrocardiogram (ECG) data; electromyography (EMG) data; electroencephalogram (EEG) data; and movement data, for example, accelerometer data.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

For many applications, it is not necessary to store all possible features of a stationary dataset. Rather, only certain features may be of interest for analysis. Embodiments of this disclosure relate to a method of automatically extracting salient features of a stationary dataset and storing the salient features in an index. The index provides for improved search and retrieval of the salient features of the dataset.

The concepts described herein provide for the reduction of a stationary dataset through salient segmentation. A stationary dataset refers to a dataset with the property of being statistically invariant, where the term invariant means that a statistic describing the dataset remains within a predefined range, percentage, or other measure across subsets of the dataset. As an example, the statistic is standard deviation of data in a dataset, and the standard deviation is within a predefined range across subsets of the dataset. A non-stationary dataset may include one or more data subsets which can be categorized as stationary datasets. Examples of stationary datasets include statistically invariant images and statistically invariant time series signals.

Salient segmentation identifies interesting features within a sequence of data points. For example; an interesting feature in a thermal image may be a hotspot; an interesting feature in a sound signal may be the periodic change of frequency related to unbalanced rotation of a spinning object, or related to vehicles passing by on a street; an interesting feature in a seismograph signal may be explosions or ground shifts; an interesting feature in a heartbeat signal may be an arrhythmia; an interesting feature on an X-ray of a semiconductor may be a crack; an interesting feature of a temperature log may be a heat wave; and so forth.

A salient segmentation methodology identifies and indexes interesting features. A salient segmentation methodology may also isolate and store the interesting features from the stationary dataset to reduce the amount of data necessary to adequately describe the dataset.

A region of interest (ROI) within a stationary dataset is selected and analyzed. The ROI may encompass the entire stationary dataset. The salient segmentation methodology calculates saliency for many or all of the data points within the ROI, determines a saliency function for the ROI including those points for which saliency has been calculated, and identifies local maxima of the saliency function. Local maxima indicate interesting features of the ROI. For each local maximum of the saliency function, the salient segmentation methodology identifies a segment of the stationary database that includes the interesting feature and indexes the segment.

The methodology may also isolate the interesting features from the dataset. For example, the segments may be copied from the stationary dataset to a reduced dataset. For another example, all data between segments in a stationary dataset may be deleted to create a reduced dataset. An augmented index can be created from a reduced dataset by adding identifying information for the included segments, such as a time stamp for a time signal or a pixel location for an image.

Although salient segmentation has been discussed for isolating and preserving interesting features of a dataset, it may also be used to identify and remove outlying portions of a dataset. For example, it may be desirable to eliminate interference from a sound signal, or to remove black marks from a scanned image.

As described above, salient segmentation may be performed on a stored dataset. Alternatively, salient segmentation may be performed in substantially real time.

Figure 1A:
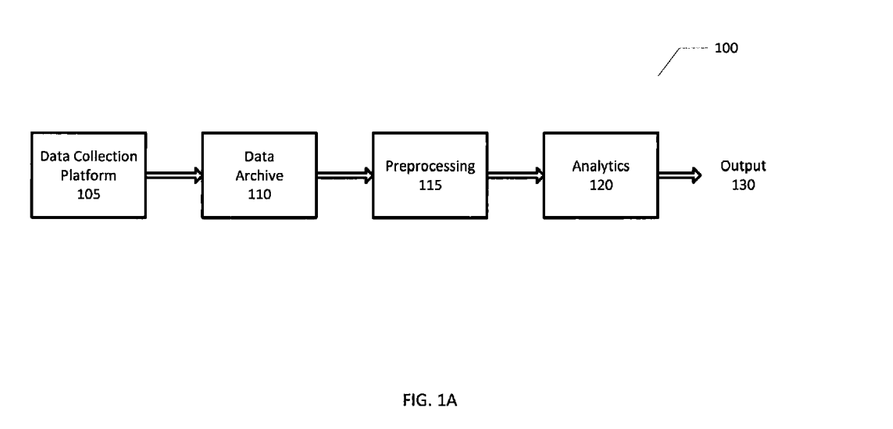
FIG. 1A illustrates an example system 100 in which salient segmentation is used.

FIG. 1A illustrates an example system 100 in which salient segmentation is used according to an embodiment of this disclosure. Data is collected in data collection platform 105 and stored in data archive 110. The data in archive 110 is preprocessed in preprocessing block 115 and analyzed in analytics block 120. The results of the analysis are output in appropriate form at output 130.

Data collection platform 105 includes, for example, data collection from sensors, data collection from questionnaires, and data collection from observation.

Sensor data may include, but is not limited to, data from one or more sensors configured to determine data from a human or animal body. Sensor data may represent electrical signal data, measured either directly or indirectly. Sensor data may represent mechanical signal data. For example, mechanical signal data may relate to position in one or more directions (e.g., one, two, or three axes), or derivatives of position in one or more directions, for example velocity or acceleration. Further, mechanical data may relate to orientation with respect to one or more axes, or one or more derivatives of orientation with respect to one or more axes.

Collected data may include imaging data. For example, data may include: optical image data such as visible, infra red or ultraviolet image data; thermal image data (e.g., near or far IR); X-ray image data; and other forms of image data in one, two or three dimensions. For example, image data may be magnetic resonance image data or computer tomography image data. Optionally, but not necessarily, the image data may be time series image data.

Collected data may additionally or alternatively include data relating to the level of one or more substances in a body fluid; for example, levels of glucose, insulin, oxygen, proteins, and antibodies.

In some implementations, collected data may include data sensed from a computer network and/or relating to data security or traffic on the network.

In some implementations, collected data may include data relating to a corpus of digital documents, which may include multimedia documents.

In some implementations, collected data may include biological data relating to one or more biological entities, for example data relating to gene expression, such as microarray data, and/or sequence data and the like.

Data archive 110 includes any form of data storage, including all forms of volatile and non-volatile memory. The data may be structured, for example in a database. Data in archive 110 includes raw data in the form of analog or digital information, and converted data, such as analog-to-digital converted data. Data in archive 110 also may include metadata related to a file, dataset, or points within a dataset.

Preprocessing block 115 includes methodologies for preprocessing a dataset. A methodology may be implemented in hardware, software, or firmware, or in some combination of hardware, software, and firmware. Some examples of preprocessing methodologies include methodologies for noise reduction, data imputation, feature extraction, feature conditioning, feature selection, and symbolic representation, one or more of which may used to preprocess a dataset.

Analytics block 120 includes methodologies for analyzing the data. Some examples of analytics methodologies include methodologies for training the analytics system, model generation, comparison of datasets or metadata, and prediction.

Output 130 may be in paper form, or may be in electronic form such as electronic files or instructions for a graphical user interface. There may be intermediate outputs (not shown), such as between preprocessing methodologies, between analytics methodologies, or between preprocessing block 115 and analytics block 120.

System 100 may be implemented within one physical device, or may alternatively be implemented in multiple devices. For example, a data collection platform 105 is implemented in one device and the data transmitted to another device for storage in a data archive 110, whereas a preprocessing block 115 and an analytics block 120 are implemented in yet another device or devices. For another example, a data collection platform 105, a data archive 110, and a preprocessing block 115 are implemented in one device, with an analytics block 120 implemented in another device. Many other configurations of the components shown in FIG. 1A are possible, and configurations with multiple of one or more of the components 105, 110, 115, or 120 shown in FIG. 1A are also possible.

Figure 1B:
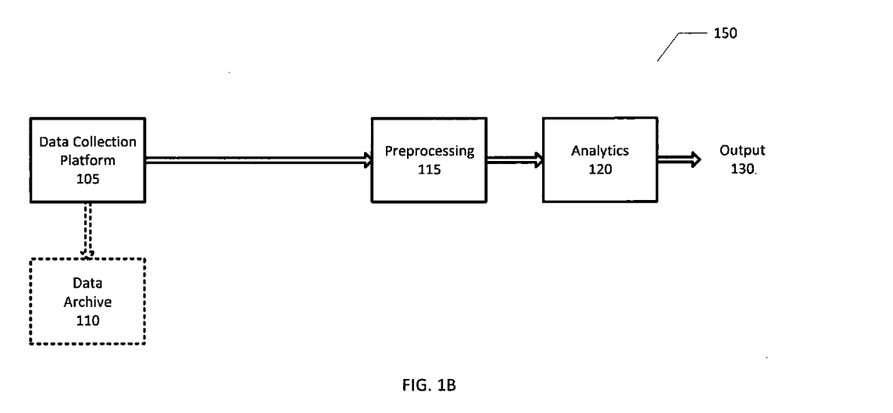
FIG. 1B illustrates another example system 100 in which salient segmentation is used.

FIG. 1B illustrates a system 150 similar to the system 100 of FIG. 1A. System 150 is implemented for near real time analysis of a stream of information, such as near real time analysis of a time series signal or streaming image information. In system 150, data archive 110 is optional for storing the data from data collection platform 105, and such data storage in data archive 110 may be performed in parallel to the preprocessing in block 115.

Reduction of stationary datasets through salient segmentation is described below in detail with respect to time series signal datasets for ease of understanding. The concepts described, however, apply equally to the reduction of other types of stationary datasets.

Definitions related to time series signals:

Time series signal: A time series signal $T=\{t1, t2, \ldots, tn\}$ is composed of an ordered set of n points in the time domain.

Window: A window is a contiguous set of points in T of length m where m<n (generally m<<n). A time series of size n has a total of n-m+1 unique windows. Segment: A segment s is a contiguous set of points in T of length m' where m≤m'≤n (generally m'>m and m'<<n). A segment s encapsulates a window w such that s is centered over w.

Window saliency: Saliency is a measure of the "interestingness" of a window. More interesting windows are assigned a higher saliency than less interesting windows.

Salient segmentation: Salient segmentation is the process of extracting the most salient (or interesting) segments from a time series signal.

Salient time series index: An index composed of primarily or only salient segments from a time series signal.

Figure 2:
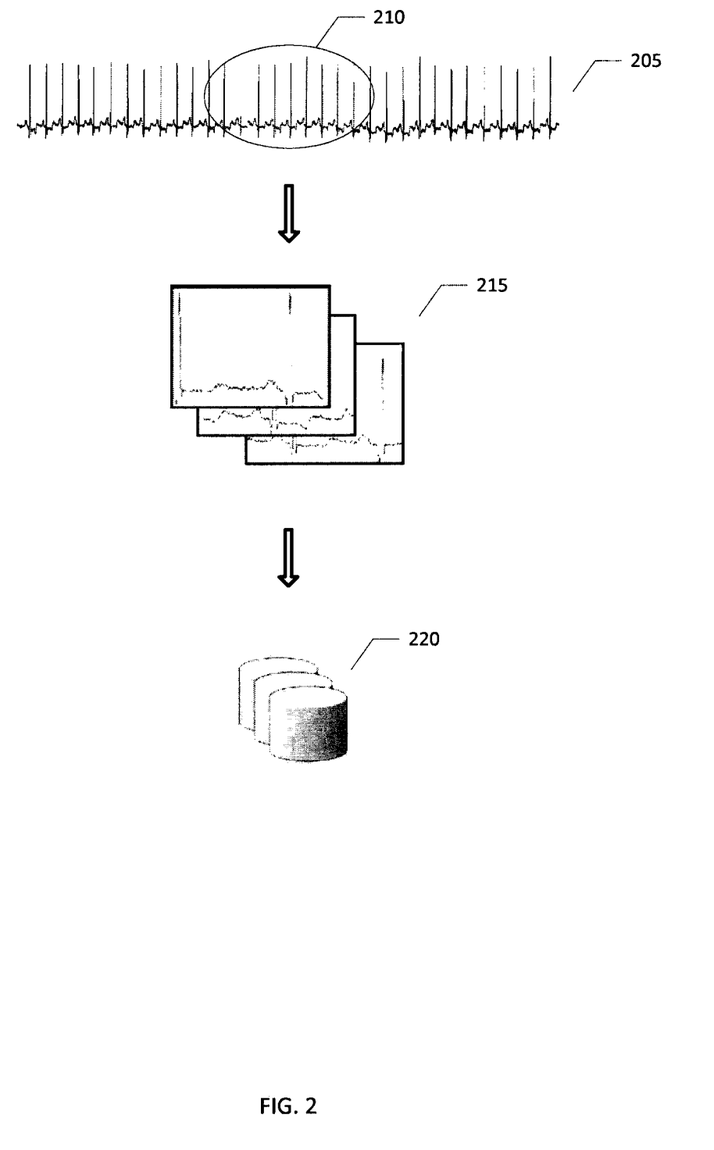
FIG. 2 illustrates an example of salient segments extracted from a time series signal.

FIG. 2 illustrates a heartbeat by way of an example of a time series signal 205 according to an embodiment of this disclosure. A region of interest 210 (ROI) is selected for salient segmentation from the time series signal 205. Searching for all possible segments within an ROI can yield a large number of results, many of which are redundant. For many analyses, only certain features of a signal are interesting. Therefore, the segments containing the interesting features may be saved and the rest removed. In the example of FIG. 2, the segments containing interesting features are labeled salient segments 215. The segments are stored in data store 220. Data store 220 is similar to data archive 110 of FIG. 1.

Salient segmentation has the following three properties as goals according to an embodiment of this disclosure:
a. Most or all salient patterns are segmented;
b. Most or all salient patterns are segmented consistently (i.e., alignment); and
c. Near linear algorithmic complexity.

The first property "all salient patterns are segmented" ensures that most or all segments that are similar to a salient segment are also labeled salient. The second property "all salient patterns are segmented consistently" ensures alignment and therefore removes redundancy. Salient patterns should only be indexed once unless a translation of that pattern adds significant information. The third property "near linear algorithmic complexity" is required for large datasets: a high complexity methodology would not only drain resources, but introduce a large delay from the time data was received to the time it becomes available for information retrieval tasks. Salient segmentation offers a near linear time methodology, allowing efficient processing of a time series signal.

Figure 3:
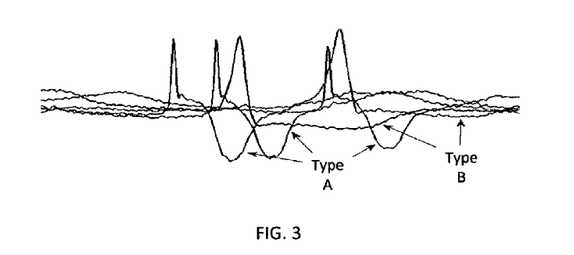
FIG. 3 illustrates an example of redundancy in motif discovery.

FIG. 3 illustrates the desirability of salient segmentation in the context of an ECG signal. Illustrated are the top five ECG motifs returned by a motif discovery methodology performing motif discovery on a raw dataset. There are only two unique patterns, labeled Type A and Type B. Three redundant Type A patterns and two redundant Type B patterns are returned. Returning additional motifs only yields a larger majority of redundant segments. Medical time series signals are particularly prone to motif redundancy due to their cyclical nature. Hence, finding the true makeup of a medical time series signal using traditional motif discovery methodologies is difficult, at best. Salient segmentation, however, has been shown to reduce the amount of redundancy in characteristic motifs by more than 85%.

In addition, an ROI may contain many common and uninteresting segments. Consider, for example, an accelerometer at rest. Returning matches to such non-salient segments will yield little or no useful information. Limiting searches to only salient segments within an ROI not only reduces the number of returned results, but also improves the quality of those results by ignoring redundant and uninteresting segments, thereby increasing relevancy of the results. Experiments have shown that salient segmentation decreases the overall number of segments in a time series signal by more than 98%.

Indexing time series signals to search and mine is an extremely difficult problem due to high dimensionality, high entropy, and massive datasets. Salient segmentation uses a signals distribution to find salient segments and therefore needs very little parameterization and can be applied to virtually any time series signal for improved search speed, improved search results, and reduced dataset size.

Salient Segmentation Methodology as Applied to Time Series Signals

Saliency is defined as the least probable segments within a region of interest (ROI).

A time series signal is modeled as a Markov chain such that the property of Equation 1 holds.

$$Pr(T_{n+1}|T_1=t_1, T_2, \ldots, T_n=t_n) = Pr(T_{n+1}|T_n=t_n) \qquad (1)$$

The transition distribution for a time series signal is calculated by taking a histogram of all possible transitions for each state.

In some implementations, because the transition distributions for proximal states are quite similar for most time series signals, close states are grouped together in bins such that each bin has an equal number of samples to estimate its respective transition distribution. Binning is accomplished by first estimating the distribution of states, then dividing the state space into groups such that each group has an equal probability of occurrence.

Figure 4:
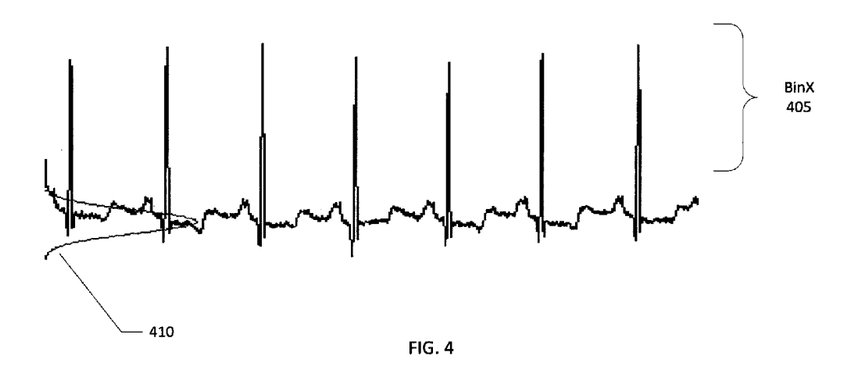
FIG. 4 illustrates an implementation of binning the states in a time series signal according to state distribution.

FIG. 4 gives an example of binning using an ECG signal according to an embodiment of this disclosure. Each shaded region represents a distinct bin, for example BinX 405, and has an equal probability of occurrence using the distribution 410 displayed to the left.

For implementations using binning, each state of the time series, denoted Ti, uses the transition distribution computed for its corresponding bin, Bin_Ti and is defined in Equation 2 as:

$$Pr(T_i|T_{i-1}=t_{i-1}) = Pr(T_i|Bin_{T_{i-1}}=Bin_{t_{i-1}}) \quad (2)$$

Note that binned states are only used for the prior state and not for the transition states. The transition states use the entire range to improve sensitivity.

Each point t_i in a time series corresponds to a window w_i centered around point t_i The probability P(w_i) for each window w_i is calculated in Equation 3 as:

$$Pr(w_i) = \prod_{j=i-(m/2)}^{i+(m/2)} Pr(T_j \mid Bin_{T_{j-1}} = Bin_{t_{j-1}}) \quad (3)$$

Each point's saliency is defined in equation 4 as:

$$\text{Saliency} = -\log Pr(w_i) \quad (4)$$

A time series saliency function (TSF) is constructed by concatenating each successive point's saliency as illustrated in Equation 5 such that:

$$F_{saliency} = \{\text{Saliency}_1, \text{Saliency}_2, \ldots, \text{Saliency}_{n-m-1}\} \quad (5)$$

Each local maximum in the TSF is considered salient and its corresponding segment is inserted into the index. Saliency functions can contain a significant amount of noise, thus resulting in over-segmentation or too many maximums. The TSF may be filtered to eliminate much of the noise. For example, a set of linear approximations calculated by the Ramer-Douglass-Peucker (RDP) methodology is used to filter the TSF. The RDP methodology begins with a linear approximation with endpoints at the first point and the last point of the TSF. Next, the distance between the linear approximation and each point between the first and last point is calculated. If the point with the largest distance is above a given threshold thr, the signal is estimated by two linear approximations: one being from the first point of the TSF to the point with the largest distance; and one being from the point with the largest distance to the last point of the TSF. The methodology is repeated on both linear approximations and continues until no point is more than the threshold distance from its linear approximation. For filtering the TSF, the value of thr is a function of the standard deviation of the estimated TSF as shown in Equation 6.

$$thr = \alpha\sigma \quad (6)$$

TSF's with higher standard deviations generally have both a larger amount of noise and disparity between peaks and valleys. Hence, TSFs with a large standard deviation require a more aggressive filter. A larger value of $\alpha$ will result in fewer maximums while a smaller value will result in more maximums.

Filtering the TSF can result in a slight misalignment between segments. This means that the calculated locations of the salient points after the filtering have a slight variation from the true locations. Therefore, an additional $\delta$ points are added before and after a segment to create an elastic window defined by the range $[i-(m'/2)-\delta, i+(m'/2)+\delta]$. When the segment is searched, a window of size m' will compare all windows located in that range. As $\delta \ll n$, the elastic window results in only a small decrease in performance.

Figure 5:
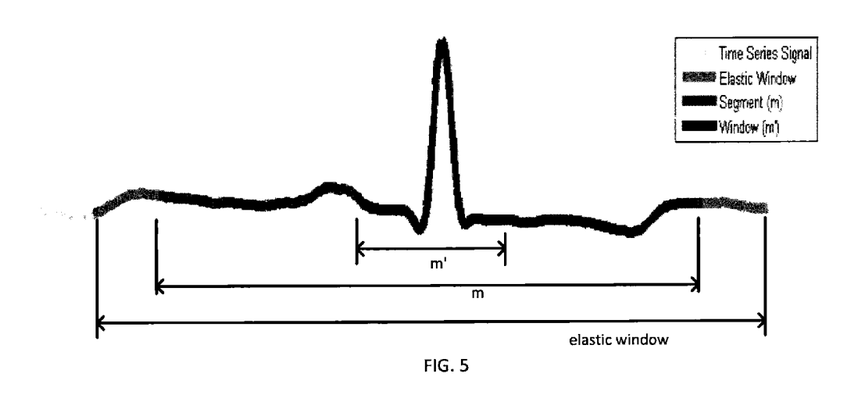
FIG. 5 illustrates an example of a time series signal.

FIG. 5 illustrates an example of how a window of length m', a segment of length m, and an elastic window may be related in a time series signal according to an embodiment of this disclosure. FIG. 5 is merely illustrative that, generally, m'<m<(elastic window).

In other implementations, the saliency of a time point t_i is calculated using the entropy of different window sizes centered at t_i, as described by Equation 7, where W is the set of window sizes.

$$Pr(t_i) = \frac{1}{|W|} \sum_{\omega \in W} \sum_{j=i-\omega/2}^{i+\omega/2} p(t_i) \log p(t_i) \quad (7)$$

By calculating saliency using Equation 7 instead of Equation 4, additional filtering may not be necessary.

Quantization of the range and calculation of the transition distribution is done in linear time. The TSF is computed in approximately the time m*n using Equation 3. However, the TSF can be calculated in real time considering at each point the change from the previous point, resulting in one division and one multiplication per point and yielding a runtime of approximately n. Finding maximums and extracting segments can both be done in linear time yielding an overall upper bound of approximately n*log(n).

As features are extracted from a time series signal, an overall profile may also be constructed in which features are marked as normal or anomalies. Profiling also allows tagging of features with ranking metadata, allowing for improved organization and searching.

Examples of Applications for Salient Segmentation

Salient segmentation can be used to search electronic health signal records (EHSRs). These records include various time series signal types such as electrocardiogram (ECG), electromyography (EMG), electroencephalogram (EEG), and accelerometer data. Medical professionals can choose ROIs from time series signals that they feel are important. These regions are then segmented using salient segmentation resulting in a number of 'interesting' segments contained within the ROI. The salient segments can then be passed to a signal database to find similar patterns from other patients. Extracting patient information such as age, height, and sex from the electronic health records and merging search results from various types of signals can be used to further focus searches. Search results, which include other medical cases with similar signal patterns, can be analyzed to create a more objective diagnosis or treatment.

The advent of remote and wearable medical sensing has created a dire need for efficient medical time series databases. Wearable medical sensing devices provide continuous patient monitoring by various types of sensors, such as accelerometers for activity monitoring, ECG for heart monitoring; and pulse oximeters for blood oxygen saturation monitoring. Such devices have the potential to create massive amounts of data. For example, there are millions of people worldwide implanted with a pacemaker. If each pacemaker had the ability to gather, store, and transmit an ECG signal, the amount of transmitted data could exceed hundreds of terabytes of data per day. Salient segmentation may be used to reduce the data storage requirements for each signal.

Medical data can be extremely time sensitive, requiring timely analysis from healthcare professionals to detect potential health emergencies. Therefore, medical time series databases must be able to store and index datasets in such a way as to enable the prompt extraction of information.

Salient segmentation may be used to reduce the number of searchable segments for each signal.

Experiments

Two experiments were conducted comparing a dataset in its original form to the same dataset reduced by salient segmentation as described by Equations 2-4, the experiments being: (A) search and (B) motif discovery. The search experiment demonstrates the first two properties for salient segmentation, namely "all salient patterns are segmented" and "all salient patterns are segmented consistently." The motif discovery experiment further proves the second property by demonstrating the removal of redundancy by salient segmentation.

The three datasets used by this paper are as follows:
a) MIT-BIH Arrhythmia Database (ECG). This dataset contains several 30-minute segments of two-channel ambulatory ECG recordings. These sample included arrhythmias of varying significance.
b) Gait Dynamics in Neuro-Degenerative Disease Database. This dataset contains data gathered from force sensors placed under the foot. Healthy subjects as well as those with Parkinson's disease, Huntington's disease, and amyotrophic lateral sclerosis (ALS) were asked to walk while the data was recorded. Data includes 5-minute segments for each subject.
c) WALK. This dataset contains a series of annotated recordings from a tri-axial accelerometer worn in a subject's pants pocket. Data was recorded while subjects travelled through the interior of a building.

No reduction methodology or advanced filtering was used in the analysis of salient segmentation. Each segment was inserted into the index with only a moderate low pass filter (non-weighted averaging window). Reduction methodologies and advanced filtering techniques were excluded to remove any biasing of results.

Setup for 'Search' Experiment

An index was created for each signal in the test data sets using the salient segmentation technique. Each segment in the index was compared to all possible segments in its respective time series signal using a sliding window. The closest matches from the sliding window were stored as the true closest matches for each segment. Next, each segment in the index was compared to all other segments in the index. The closest matches in the index were compared to the sliding window's closest matches to create precision-recall curves.

Each dataset was run with three elastic windows: 5, 10, and 20 data points. The elastic window was introduced to account for misalignments resulting from the linear approximations. Additional segmentation parameters for each dataset are given in Table 1, where P is the number of bins used, for example in Equation 2; m is the window size, the Filter Size is the size of the elastic window, and m' is the segment size.

TABLE 1

SEGMENTATION PARAMETERS

| Dataset | P | m | Filter Size | m' |
|---------|---|-----|-------------|-----|
| ECG     | 8 | 100 | 10          | 600 |
| Gait    | 4 | 80  | 10          | 600 |
| Walk    | 2 | 25  | 5           | 300 |

The parameter m was chosen as the average size of an "interesting" pattern. For example, a step in the gait data set (heal down to toe up) was approximately 80 data points. In the ECG data set, m was chosen to match the approximate size of the QRS complex (100 data points) instead of the entire heart beat (300-360 data points) to avoid rounding errors.

The parameter m' was chosen to give context before and after a salient region. This parameter has no affect on the location of salient points and should be chosen based on the user's need.

Setup for 'Motif Discovery' Experiment

The motif discovery experiment compares results between a published motif discovery methodology and a modified version of the motif discovery methodology using only salient segments. These methods were compared with two metrics: redundancy and coverage. Redundancy measures the percentage of the time series signal that is represented by more than one motif (i.e., the total amount of data points that are repeated in two or more motifs). Coverage measures the percentage of the time series signal that is represented by the returned set of motifs. Both motif methodologies were run with increasing k, where k is the number of closest motifs, until no new motifs were returned. The parameters listed in Table 2 were used for the experiment.

TABLE 2

MOTIF DISCOVERY PARAMETERS. ALL OTHER PARAMETERS ARE IDENTICAL TO TABLE 1

| Dataset | m'  | R | Reference Points |
|---------|-----|---|------------------|
| ECG     | 300 | 2 | 10               |
| Gait    | 80  | 2 | 10               |
| Walk    | 60  | 2 | 10               |

Medical time series are cyclic by nature. The parameters chosen to segment the signal were tuned to find individual cycles, such as one heartbeat or one step. The time series signals used for this paper contain 90-100% activity. Therefore, motif results should contain high coverage as most of the signal contains interesting patterns.

To assess redundancy, m' was reduced from the search experiment, and set to the average complete cycle time for each signal. For example, one heartbeat takes approximately 300 samples in the ECG dataset. Two steps in the WALK dataset (left and right) take approximately 60 data points, and one step in the gait dataset takes 80 data points. Only one step is used for the gait dataset as each channel measures only one foot. Reducing m' focuses the comparison on ability of the method to isolate individual cycles. A small m' should result in low overlap. However, m' has no affect on localizing salient points in salient segmentation as shown in Equation 3.

Results for 'Search' Experiment

Figure 6:
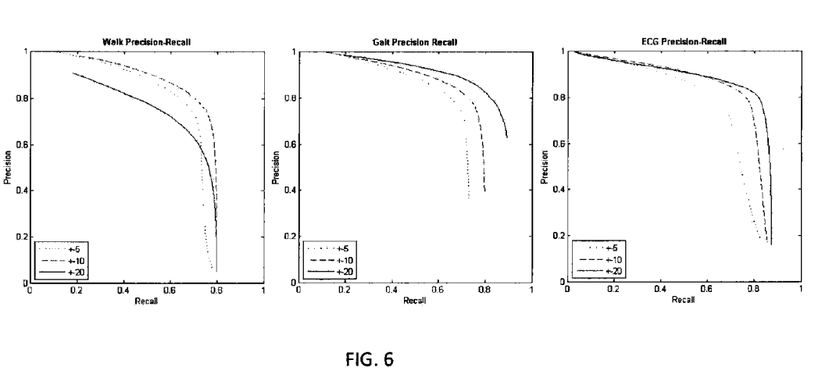
FIG. 6 illustrates test results for an example test of salient segmentation.

FIG. 6 illustrates precision-recall curves for the WALK, ECG, and gait datasets. Increasing the elastic window size has a small improvement for the gait and ECG datasets. The WALK dataset has a small improvement with a 10-point elastic window and decreased improvement with a 20-point elastic window.

There are two sources for the variability in the locations of salient points. First, the RDP approximation adds variability to the location of salient points. Second, similar patterns are not necessarily exact. Therefore, the calculation of saliency may yield slightly different locations of the most salient points in similar patterns. However, both sources of variability are quite small, requiring only small elastic windows to correct alignment. Precision-recall results will eventually decrease as the elastic window expands. With a constant m', increasing the elastic window increases the probability that a new pattern (not originally localized by salient segmentation) may be matched. The WALK dataset has a quicker drop-off in performance with respect to the elastic window due to smaller pattern sizes (in terms of data points). The average pattern size (one step) for the WALK dataset is approximately 20-25 data points. An elastic window of 20 or more data points will include an additional pattern (or step) on each side of the isolated segment. These additional patterns cause false positives for segments that lie close to true matches. This phenomenon is shown in FIG. 6. The WALK data shows a decrease in precision with a large elastic window, but recall is not affected.

The RDP linear approximation of the TSF curve added little variability to search performance. However, close inspection of the TSF curve reveals that the RDP methodology suppressed a small percentage of peaks (salient points). This suppression resulted in a minor degradation in recall performance. The gait dataset had the simplest time series signals (lowest entropy), with large differentials at the beginning and end of patterns. This causes large peaks in the TSF curve, resulting in the filtering of very few salient points. In contrast, the WALK dataset had the most variable signal (highest entropy) with the smallest differential between the start and end of patterns. The relationship between entropy and recall is shown in the figures with increased recall for lower entropy signals.

The precision-recall results are notable, considering the number of segments suppressed by salient segmentation. Table 3 shows the percentage of indexed signal for each time series data set (the elastic window was not included for coverage calculations). Salient segmentation resulted in index sizes below 2% of a sliding window index. However, segments within the index spanned near 100% of each time series signal.

TABLE 3

INDEX SIZE AND COVERAGE

| Dataset | Index Size | Coverage |
| --- | --- | --- |
| ECG | 0.4% | 99.9% |
| Gait | 1.8% | 96.7% |
| Walk | 1.6% | 98.3% |

Results for 'Motif Discovery' Experiment

Figure 7:
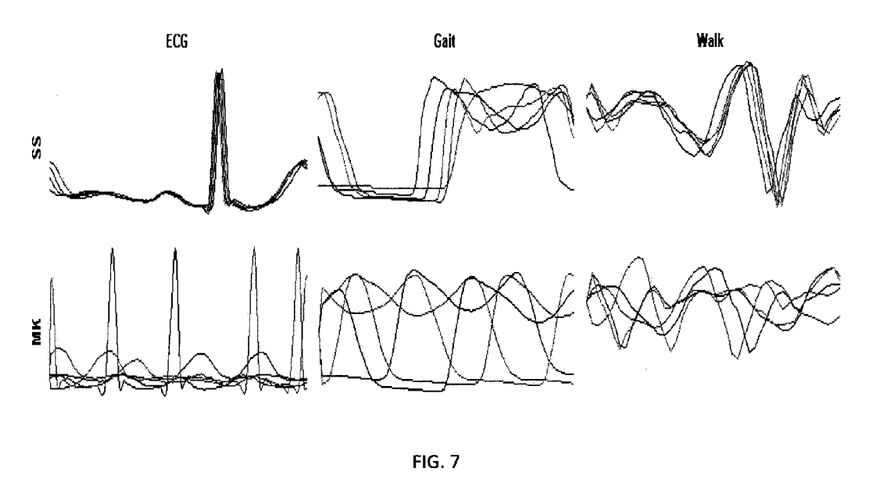
FIG. 7 illustrates test results for an example test of salient segmentation.

FIG. 7 illustrates the top 5 motifs for signals from each of datasets for both salient segmentation (shown on the top of FIG. 7, labeled SS) and a published motif discovery methodology (shown on the bottom of FIG. 7, labeled MK). Motif discovery with salient segmentation yields aligned motifs, while the comparison methodology yields motifs in an arbitrary alignment. Misaligned results demonstrate a poor representation of a signal's true makeup. By way of illustration, the results for motif discovery with salient segmentation show that all three signals are composed largely of the same pattern. The results from the comparison methodology appear to have five distinct motifs for each signal, but all five patterns are extremely similar and are just returned in different alignments.

Figure 8:
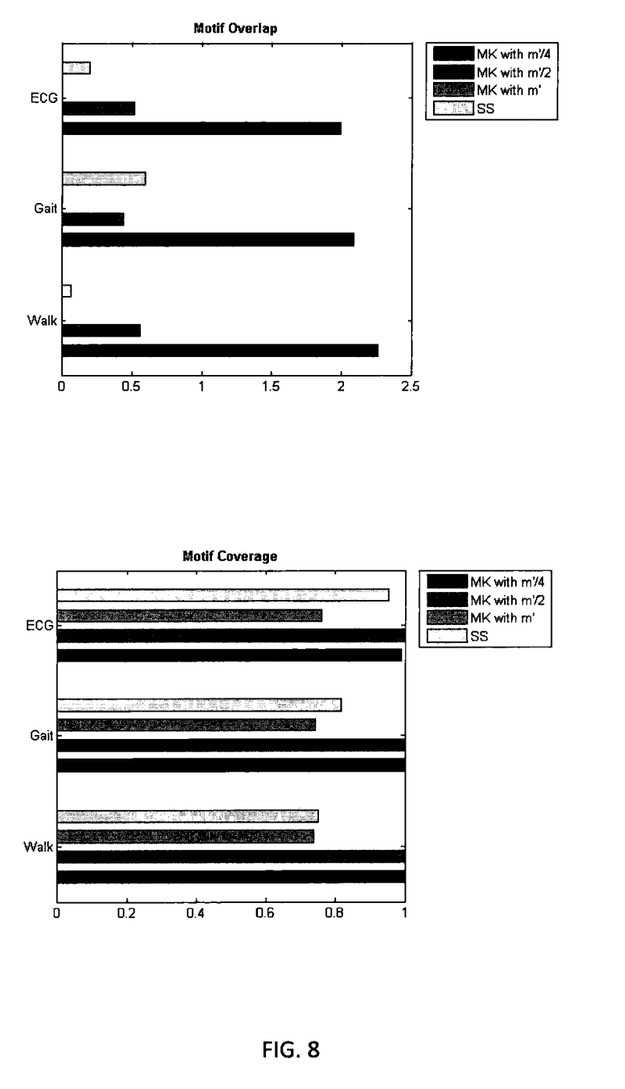
FIG. 8 illustrates test results for an example test of salient segmentation.

FIG. 8 illustrates overlap and coverage for all three data sets. The comparison methodology (denoted as MK) shows no overlap when using a window of size m' to filter trivial matches. This is expected as any points lying m' data points from a motif are considered invalid for future rounds of motif discovery, therefore avoiding overlap. Also expected, decreasing m' increases both overlap and coverage. Salient segmentation yields lower overlap than the comparison methodology for the ECG and WALK datasets, and similar overlap for the gait data.

The gait dataset resulted in a significantly higher overlap than the WALK and ECG datasets for salient segmentation. The gait dataset measures pressure from shoes as subjects walked. The on-off pressure is sharp and abrupt, often resulting in two salient points for each step (heel down and toe up). This double segmentation of some steps results in an increased amount of overlap.

Reduced coverage was exhibited for the gait and WALK datasets. Poor coverage had two causes. First, both datasets have small regions of no activity (e.g., such as the subjects standing still). These regions account for 2-10% of these datasets and result in no segmentation within these regions. Therefore, coverage is extremely low in these regions (as expected). Second, the WALK and gait datasets had the highest variability in the length of a pattern cycle. For example, the WALK dataset comprised subjects traversing hallways, and ascending/descending stairways, resulting in variable step lengths. The gait dataset's subject pool consisted of neurologically impaired patients (such as Parkinson's disease and ALS), resulting in inconsistent gait. Coverage can be improved by decreasing the a parameter for the RDP methodology or by increasing the size of m'. However, these changes have a trade-off of with redundancy (overlap).

The overlap and coverage results are particularly compelling as no assumptions are made about trivial matches when using salient segmentation. All and only salient segments are matched in the motif discovery methodology. No assumption is made on the proximity of one segment to another. These results are even more encouraging when considering the alignment offered by salient segmentation. All similar motifs are in alignment vastly improving the quality of results of motif discovery methodologies.

Additional Experiments

Further experiments were conducted comparing a dataset in its original form to the same dataset reduced by salient segmentation as described in part by Equation 7. In particular, experiments were conducted to compare the amount of pruning required by a Locality Sensitive Hashing (LSH) technique when performing the LSH technique on the dataset in its original form and its reduced form.

LSH is based on a family of hashing functions H that are (r1, r2, p1, p2)-sensitive meaning that for any v, $\in$S:

$$\text{if } v \in B(q,r1) \text{ then } \Pr H[h(q)=h(v)] \geq p1$$

$$\text{if } v \notin B(q,r2) \text{ then } \Pr H[h(q)=h(v)] \leq p1$$

where v and q are high dimensional objects within search space S, B(q, r) represents the set of objects within distance r to q, p1>p2, and r2>r1. The gap between p1 and p2 is increased by combining several functions from the same (r1, r2, p1, p2)-sensitive family. For the purpose of this paper, r1=R and r2=cR where c is a constant.

More simply, an LSH scheme guarantees within some probability that all objects within distance R to the query object are returned. In addition, all objects that fall at a distance greater than cR are not returned with some probability. The result sets of LSH are pruned such that all objects greater than distance R are suppressed. Pruning is extremely costly even with a sub-linear number of distance computations. One method to improve pruning times is to reduce the number of segments indexed within a databases. However, this must be done intelligently as arbitrarily removing objects will severely reduce the quality of search results. Salient Segmentation reduces the size of a time series index without degrading search performance.

There are two main components of the experimental implementation: index structure and index population. Index structure utilizes LSH and is the process of indexing segments. Index population is the process of inserting salient segments into the index structure.

Two databases were created. Both databases used an LSH indexing structure. The first database used a salient index and the index was populated with only salient segments using the Salient Segmentation concept described in part by Equation 7. The second database used a full index populated with all segments using the LSH technique.

Three stationary datasets were used in the additional experiments:
  a) MIT-BIH Arrhythmia Database (ECG). This dataset contains several 30-minute segments of two-channel ambulatory ECG recordings. These sample included arrhythmias of varying significance.
  b) Gait Dynamics in Neuro-Degenerative Disease Database (GAIT). This dataset contains data
  gathered from force sensors placed under the foot. Healthy subjects as well as those with Parkinson's disease, Huntington's disease, and amyotrophic lateral sclerosis (ALS) were asked to walk while the data was recorded. Data includes 5-minute segments for each subject.
  c) WALK. This dataset contains a series of annotated recordings from a tri-axial accelerometer worn in a subject's pants pocket. Data was recorded while subjects travelled through the interior of a building.

Results for the Additional Experiments

The amount of pruning was reduced by up to 95% while producing near identical search results to a complete index. In addition, Salient Segmentation was shown to produce segments with high coverage. The indexed segments covered more than 97% of the original time series for all three datasets.

CONCLUSION

By extracting primarily or only the salient features of a time series signal, redundancy is reduced resulting in a much smaller index. Thus, search and retrieval of signal features can be done faster and more accurately. Additionally, similar features are stored in a similar manner, facilitating quicker analysis of the features of the signal.

Salient segmentation models time series signals as a Markov chain. The probability of each segment within the signal is computed using this model. Segments with the lowest probabilities within a local region are considered salient and are inserted into the index. All other higher probability segments are ignored. Salient segmentation consistently segments similar patterns with similar alignments and runs with an approximate complexity of n*log(n).

Salient segmentation probabilistically determines the most important features of a time series signal. Constraining searches to only these most important features improves the quality of search while reducing redundancy.

An example of where such systems can be useful is for the medical community. Searching for common past patient cases is often performed by the medical community to help in diagnosis and treatment. Currently the medical community uses subjective textual search. However, the ability to use objective data (such as digitally measured time series data) to enhance search should increase the accuracy of example based diagnosis and treatment.

This method also simplifies queries to a database by choosing the proper segments for the user. Users can choose large regions of interest to search from a time series signal, and the proposed method segments the region of interest and identifies the most salient segments. This method can also be done in substantially in real time. This allows tagging of features as normal or anomalies as well as creation of metadata for ranking query results. An indexing structure can be provided to effectively utilize the properties of the method.

An embodiment of the invention relates to a non-transitory computer-readable storage medium having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the invention, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs"), and ROM and RAM devices. Examples of computer code include machine code, such as produced by a compiler, and files containing higher-level code that are executed by a computer using an interpreter or a compiler. For example, an embodiment of the invention may be implemented using Java, C++, or other object-oriented programming language and development tools. Additional examples of computer code include encrypted code and compressed code. Moreover, an embodiment of the invention may be downloaded as a computer program product, which may be transferred from a remote computer (e.g., a server computer) to a requesting computer (e.g., a client computer or a different server computer) via a transmission channel. Another embodiment of the invention may be implemented in hardwired circuitry in place of, or in combination with, machine-executable software instructions.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit and scope of the invention. All such modifications are intended to be within the scope of the claims appended hereto. In particular, while certain methods may have been described with reference to particular operations performed in a particular order, it will be understood that these operations may be combined, sub-divided, or reordered to form an equivalent method without departing from the teachings of the invention. Accordingly, unless specifically indicated herein, the order and grouping of the operations is not a limitation of the invention.

The invention claimed is:
1. A non-transitory computer-readable storage medium, comprising executable instructions to:

receive digital data related to a stationary dataset; and
reduce an amount of data used to describe the stationary dataset by creating an index of salient features of the stationary dataset, the index created by:
  computing a saliency function indicating the saliency of each of a plurality of data points in the digital data, wherein computing the saliency function comprises:
    calculating a state probability distribution of the stationary dataset,
      based on the state probability distribution, grouping the digital data such that each data group has an equal probability of occurrence in the stationary dataset; and
      for each data group, calculating a transition distribution indicating the probability of a transition from the data group to other states;
  determining a set of at least one local maxima in the saliency function; and
  for each maximum in the set of at least one local maxima, inserting a segment of the digital data into the index, the segment corresponding to a portion of the digital data including the data point associated with the local maximum.

2. The computer-readable storage medium of claim 1, wherein computing the saliency function further comprises, for each data point in the plurality of data points:
  based on the transition distributions calculated for each data group, determining the probability of the data point being in its present state given that a neighbor data point is in a given data group.

3. The computer-readable storage medium of claim 2, wherein computing the saliency function further comprises:
  calculating a probability of occurrence $P(w)$ for a window of data points encompassing the data point; and
  determining the saliency of the data point equal to the negative of the logarithm of the probability of occurrence of the window ($-\log P(w)$).

4. The computer-readable storage medium of claim 2, wherein computing the saliency function further comprises:
  for each of a plurality of framing windows encompassing the data point,
    calculating a probability of occurrence $P(w)$ for the framing window;
    calculating an adjusted probability of occurrence by multiplying the probability of occurrence of the framing window by the log of the probability of occurrence of the framing window ($P(w)*\log P(w)$);
    calculating an aggregate adjusted probability by multiplying the adjusted probabilities of all of the framing windows; and
    determining a saliency of the point by dividing the aggregate adjusted probability by the number of framing windows.

5. The computer-readable storage medium of claim 1, wherein computing the saliency function further comprises, for each data point in the plurality of data points:
  based on the transition distribution, determining the probability of the data point being in its present state given that a neighbor data point is in a given state.

6. The computer-readable storage medium of claim 5, wherein computing the saliency function further comprises:
  for each of a plurality of framing windows encompassing the data point,
    calculating a probability of occurrence $P(w)$ for the framing window; and
    calculating an adjusted probability of occurrence by multiplying the probability of occurrence of the framing window by the log of the probability of occurrence of the framing window ($P(w)*\log P(w)$);
    calculating an aggregate adjusted probability by multiplying the adjusted probabilities of all of the framing windows; and
    determining a saliency of the data point by dividing the aggregate adjusted probability by the number of framing windows.

7. The computer-readable storage medium of claim 1, the plurality of data points being associated with points in time in a stationary time series signal dataset.

8. The computer-readable storage medium of claim 7, the digital data being electronic health signal data.

9. The computer-readable storage medium of claim 8, the electronic health signal data being at least one of: electrocardiogram (ECG) data; electromyography (EMG) data; electroencephalogram (EEG) data; and movement data.

10. The computer-readable storage medium of claim 1, the plurality of data points being pixels in a stationary image dataset.

11. The computer-readable storage medium of claim 1, the executable instructions including instructions to store metadata in the index, the metadata related to at least one of: the local maximum; the data point associated with the local maximum; and the segment.

12. The computer-readable storage medium of claim 11, the executable instructions including instructions to search the index for one of: a predefined value for an item of metadata; a predefined type of metadata; a type of segment; and a set of unique motifs in the segments.

13. The computer-readable storage medium of claim 12, the executable instructions including instructions to compare a portion of the results of the search to a database of information, and determine a list of information in the database of information that is similar to the portion of the results of the search.

14. A system, comprising:
  an input configured to receive time series signals;
  a conversion unit configured to convert a time series signal received at the input into a dataset of digital values;
  a processing unit; and
  a computer readable storage medium comprising instructions thereon for configuring the processing unit to reduce an amount of data used to describe the time series signal by creating an index of salient features of the dataset, the index created by:
    determining a saliency function for the dataset, indicating the saliency of a plurality of data points in the dataset, wherein determining the saliency function of the plurality of data points comprises to:
      calculate a state probability distribution of the dataset,
      based on the state probability distribution, group the digital data such that each data group has an equal probability of occurrence in the dataset, and
      for each data group, calculate a transition distribution indicating the probability of a transition from the data group to other states;
    identifying local maxima in the saliency function; and
    creating the index from portions of the dataset, wherein each portion of the dataset includes a data point associated with a local maximum of the saliency function.

15. The system of claim 14, the processing unit configured to create the index in real time.

16. The system of claim 14, the received time series signal being one of an electrocardiogram signal, electromyography signal, electroencephalogram signal, and accelerometer signal.

17. The system of claim 14, included within a medical device.

18. A method, comprising: in a computing device,
reducing an amount of data describing a stationary dataset by:
calculating a saliency function for a plurality of data points in the stationary dataset, the saliency function indicating for each of the plurality of data points the probability that the data point would be in its current state given the states of neighbor data points, wherein calculating the saliency function for the plurality of data points comprises:
calculating a state probability distribution of the stationary dataset,
based on the state probability distribution, grouping the data points such that each data group has an equal probability of occurrence in the stationary dataset; and
for each data group, calculating a transition distribution indicating the probability of a transition from the data group to other states;
determining from the saliency function a set of low-probability data points each of which has a lower probability of occurrence than probabilities of other data points in the stationary dataset; and
for each data point in the set of low-probability data points, inserting into an index a portion of the stationary dataset including that data point.

19. The method of claim 18, the stationary dataset representing a stationary time series signal, the plurality of data points being associated with a plurality of points in time, respectively.

20. The method of claim 18, the stationary dataset representing a stationary image, the plurality of data points being associated with a plurality of pixels, respectively.

21. The method of claim 18, further comprising: adding metadata to the index.

22. A medical device comprising:
an input to receive digital data relating to a stationary data set; and
means for reducing an amount of information describing the stationary dataset, comprising:
means for computing a saliency function indicating the saliency of each of a plurality of data points in the digital data, wherein computing the saliency function comprises:
calculating a state probability distribution of the stationary dataset,
based on the state probability distribution, grouping the data points such that each data group has an equal probability of occurrence in the stationary dataset; and
for each data group, calculating a transition distribution indicating the probability of a transition from the data group to other states;
means for determining a set of at least one local maxima in the saliency function; and
means for inserting, for each maximum in the set of at least one local maxima, a segment of the digital data into an index, the segment corresponding to a portion of the digital data including the data point associated with the local maximum.

* * * * *